United States Patent
Sambugaro

(10) Patent No.: US 8,375,689 B2
(45) Date of Patent: Feb. 19, 2013

(54) PACKAGING MACHINE USING HEAT SEALABLE FILM

(75) Inventor: Alessandra Sambugaro, Vicenza (IT)

(73) Assignee: Lorapack S.R.L., Thiene (Vicenza) (IT)

( * ) Notice: Subject to any disclaimer, the term of this patent is extended or adjusted under 35 U.S.C. 154(b) by 69 days.

(21) Appl. No.: 12/300,378

(22) PCT Filed: May 18, 2007

(86) PCT No.: PCT/EP2007/054818
§ 371 (c)(1),
(2), (4) Date: Nov. 11, 2008

(87) PCT Pub. No.: WO2007/135088
PCT Pub. Date: Nov. 29, 2007

(65) Prior Publication Data
US 2009/0229228 A1    Sep. 17, 2009

(30) Foreign Application Priority Data
May 18, 2006   (IT) ................. VI2006A0150

(51) Int. Cl.
*B65B 9/08* (2006.01)
(52) U.S. Cl. ............... 53/550; 53/222; 53/551; 53/562
(58) Field of Classification Search .......... 53/463, 53/466, 450–451, 220–224, 228, 230, 232, 53/203, 550, 562, 545, 551; 493/478
See application file for complete search history.

(56) References Cited

U.S. PATENT DOCUMENTS

| | | | |
|---|---|---|---|
| 4,608,797 A | 9/1986 | Shabram, Jr. et al. | |
| 4,715,166 A | 12/1987 | Kameda | |
| 5,341,625 A * | 8/1994 | Kramer | 53/459 |
| 5,385,001 A * | 1/1995 | Ramer | 53/399 |
| 5,640,834 A * | 6/1997 | Lerner et al. | 53/459 |
| 5,699,647 A * | 12/1997 | Weder et al. | 53/397 |
| 5,927,045 A * | 7/1999 | Weder et al. | 53/218 |
| 6,308,493 B1 * | 10/2001 | Mack et al. | 53/75 |
| 6,860,083 B2 * | 3/2005 | Torre | 53/55 |
| 7,258,656 B2 * | 8/2007 | Lerner et al. | 493/198 |
| 7,335,151 B2 * | 2/2008 | Toth | 493/464 |
| 7,552,571 B2 * | 6/2009 | Lerner et al. | 53/374.3 |

FOREIGN PATENT DOCUMENTS

| | | |
|---|---|---|
| DE | 19 29 956 U | 12/1965 |
| EP | 0 965 521 A1 | 12/1999 |

OTHER PUBLICATIONS

International Search Report re application No. PCT/EP2007/054818, dated Sep. 14, 2007.
Written Opinion re application No. PCT/EP2007/054818, dated Sep. 14, 2007.

* cited by examiner

*Primary Examiner* — Christopher Harmon
(74) *Attorney, Agent, or Firm* — Husch Blackwell LLP

(57) ABSTRACT

The invention is a packaging machine using heat sealable film, of the type suitable for packaging the product (P) with a heat sealable film or net (S), through the use of heat sealing rollers that make the longitudinal edge of the wrap, of cut-and-sew blades that make the two transverse edges of said wrap and of a forming tunnel that shapes said film unwound from a reel. This machine is characterized in that the above-mentioned devices and their operating accessories are all applied to and supported by a single structure, in such a way as to form a working unit in a single piece which is connected with the pin to a support, integral with a fixed base and capable of rotating angularly on a vertical plane.

6 Claims, 5 Drawing Sheets

US 8,375,689 B2

PACKAGING MACHINE USING HEAT SEALABLE FILM

BACKGROUND OF THE INVENTION

The present invention concerns a packaging machine suitable for packaging with heat sealable film, according to the general part of claim 1.

In many industrial sectors (for example, the food industry or the mechanical industry) packaging machines are widely used, which provide for packaging products by wrapping them with a heat sealable film or net.

In particular, the packaging of solid products whose dimensions are not considerable, for example, among food products, snacks, fruit and vegetables, or, in industry, small metal parts and spare parts, is carried out by creating a wrap that is sealed by means of three heat sealed edges, and precisely by making first a longitudinal sealed edge, which joins the two edges of the film or net, thus creating a tubular element in which the product is introduced, and successively making the other two sealed edges, arranged transversally with respect to the previous edge, which serve to close the above mentioned wrap at the two ends.

This operation is carried out with a "horizontal" packaging machine, called in this way because all the devices that make it up are arranged linearly on a horizontal base.

Specifically, the devices installed on a horizontal packaging machine substantially comprise: a front conveyor belt, which moves the product downstream of the machine and directs it to the packaging area, a forming tunnel that gives a substantially tubular shape to the plastic film which is continuously unwound from a reel usually arranged above said packaging area, pairs of sealing rollers that carry out the longitudinal closing edge of the wrap, so-called "cut and sew" blades that make the two transverse closing edges and also provide for separating the package from the rest of the film, and, if necessary, a rear conveyor belt that moves the packaged products away from the machine.

Alternatively, for the packaging in a single wrap of a plurality of loose products whose size is not considerable or products in powder form, like for example, among food products, rice, flour, biscuits, bread sticks or the like, the so-called "vertical" packaging machines are used, where the film is first wound around a forming tube and sealed longitudinally to obtain a tubular body, which is then closed at the bottom in such a way as to obtain a container in the shape of a bag open at the top, in which the product to be packaged is introduced, usually by gravity, and whose top is finally closed.

According to the current state of the art, the two types of packaging machines, horizontal and vertical, are the fruit of extremely complex construction processes and therefore involve high production costs that represent an investment that is difficult to amortize and often not affordable for operators who use the machine occasionally or only to package a few products.

Always according to the current state of the art, these types of packaging machines occupy considerable space, so that their use becomes a problem in places where space is limited, for example, small bakery and confectionery labs, where in a single room, in addition to the packaging machine, there are also all the other production machines.

This drawback becomes apparent when vertical packaging machines are used, where the product to be packaged is loaded in the machine from above, so that it is necessary to use large conveyor belts in order to convey the products to be packaged to the top of the machine itself.

SUMMARY OF THE INVENTION

The object of the present invention is to provide a packaging machine that uses heat sealable film and does not pose the drawbacks typical of the known horizontal and vertical packaging machines.

More specifically, the object of the present invention is to provide a packaging machine that uses heat sealable film, is simple to construct and does not involve high costs.

Still more specifically, the object of the present invention is to provide a packaging machine that uses heat sealable film and allows the user to introduce the product in the wrap, in any direction, from the horizontal to the vertical direction.

Still more specifically, the object of the present invention is to provide a packaging machine that uses heat sealable film and, though using the same devices used for conventional horizontal packaging machines, is capable of working as a vertical packaging machine.

These objects have been achieved through the construction of a packaging machine that uses heat sealable film and is provided with devices for packaging the product that are the same as those present on conventional horizontal packaging machines, and is characterized in that the above mentioned devices, that is, the reel, the forming tunnel, the sealing rollers and the cut-and-sew blades are all applied to and supported by a single frame that can rotate angularly on the vertical plane.

From a construction point of view, the frame that supports the packaging devices is provided with lateral pins connected to bearing-shaped supports applied to a fixed base.

This solution, besides simplifying construction and considerably reducing the overall dimensions of the machine, makes it possible to package the products proceeding in all directions on the vertical plane, from the horizontal to the vertical direction, with considerable advantages for the operator, who can choose the optimal working position.

In particular, the packaging machine that is the subject of the invention makes it possible to package the product making it slide vertically by gravity, using the packaging devices of a horizontal packaging machine that, as well known, are much simpler and more economic than the devices used on vertical packaging machines.

More specifically, the packaging machine that is the subject of the invention makes it possible to package products, like ice creams, that during said operation must not come into contact with external heat sources.

BRIEF DESCRIPTION OF THE DRAWINGS

The invention is illustrated in greater detail in the description of one of its possible embodiments, provided only as a non-limiting example, with the aid of the attached drawings, wherein.

DESCRIPTION OF THE INVENTION

Figure 1:
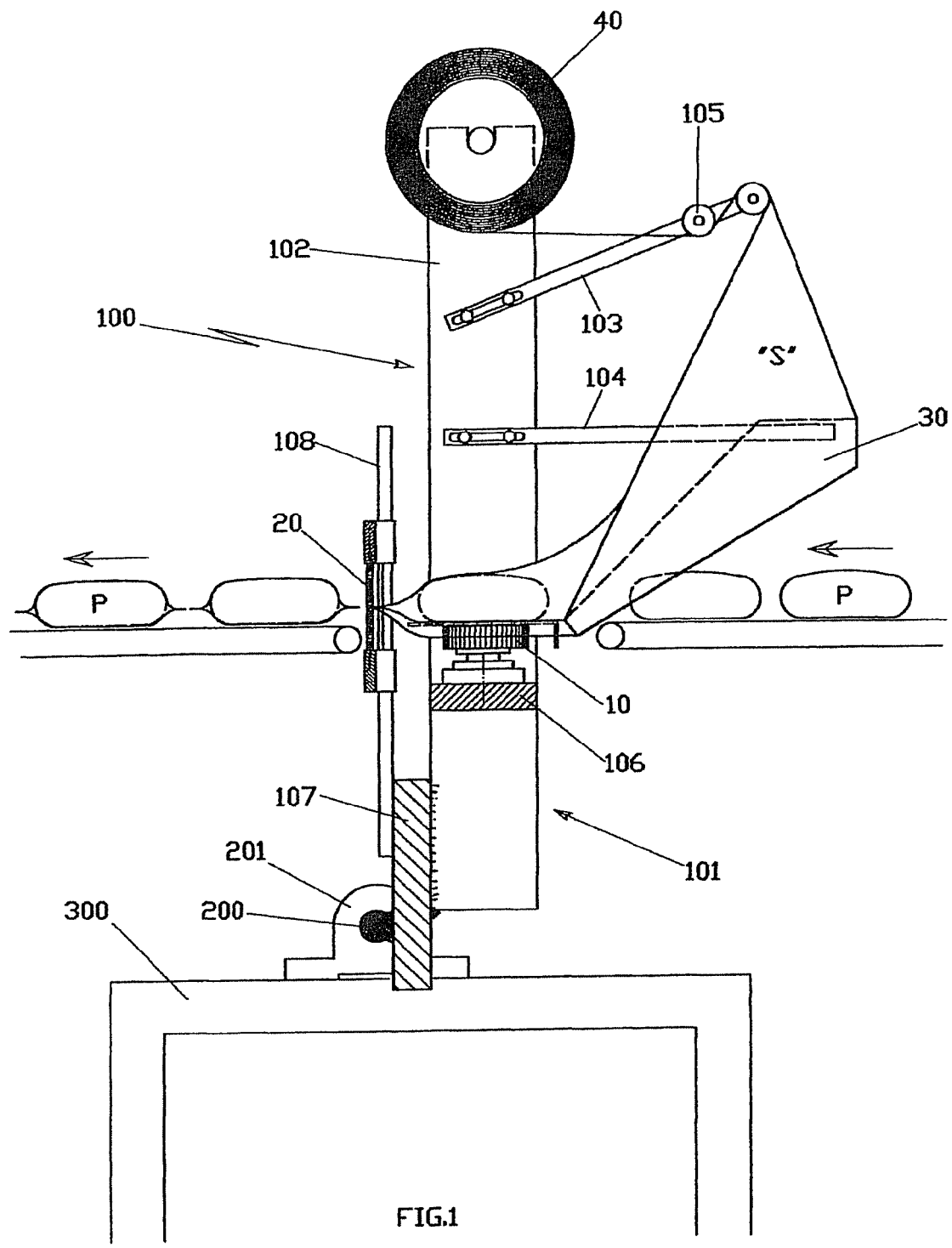
FIGS. 1-4 are schematic front elevation views of the machine that is the subject of the invention, in four different operating positions, where the direction of the product is, respectively, horizontal, inclined and vertical.

As shown in the figures, the packaging machine suitable for packaging products "P" with a heat sealable film or net "S" is of the type for packaging products by means of heat sealing rollers 10 that make the longitudinal edge, of cut-and-sew blades 20 that make the two transverse edges and of a forming tunnel 30 that shapes the above mentioned film unwound from a reel 40, the whole according to known procedures; said machine being characterized in that the above mentioned elements 10, 20, 30, 40 and their operating accessories are all applied to and supported by a single structure, in such a way as to form a working unit in a single piece, indicated as a whole by 100, which is connected with the pin 200 to a rolling bearing support 201, integral with a fixed base 300.

From a construction point of view, the working unit 100 substantially consists of a rigid frame, indicated as a whole by 101, substantially comprising two side shoulders 102 that support the reel 40, the rods 103 and 104 that respectively support the transmission rollers 105 and the forming tunnel 30, a crosspiece 106 that supports the sealing rollers 10, and a plate 107 welded to the pin 200 and supporting the uprights 108 on which the blades 20 slide.

Figure 2:
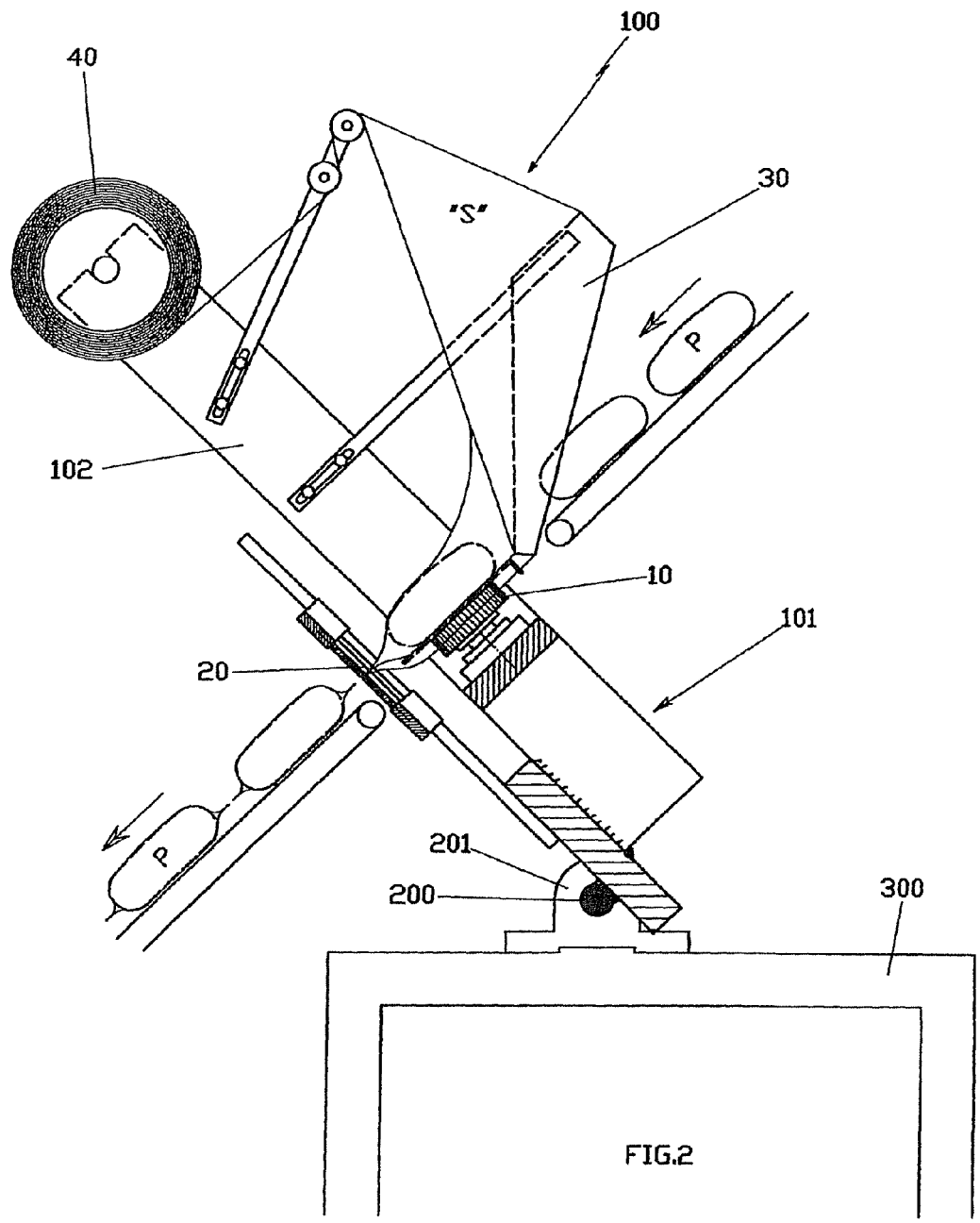
Figure 3:
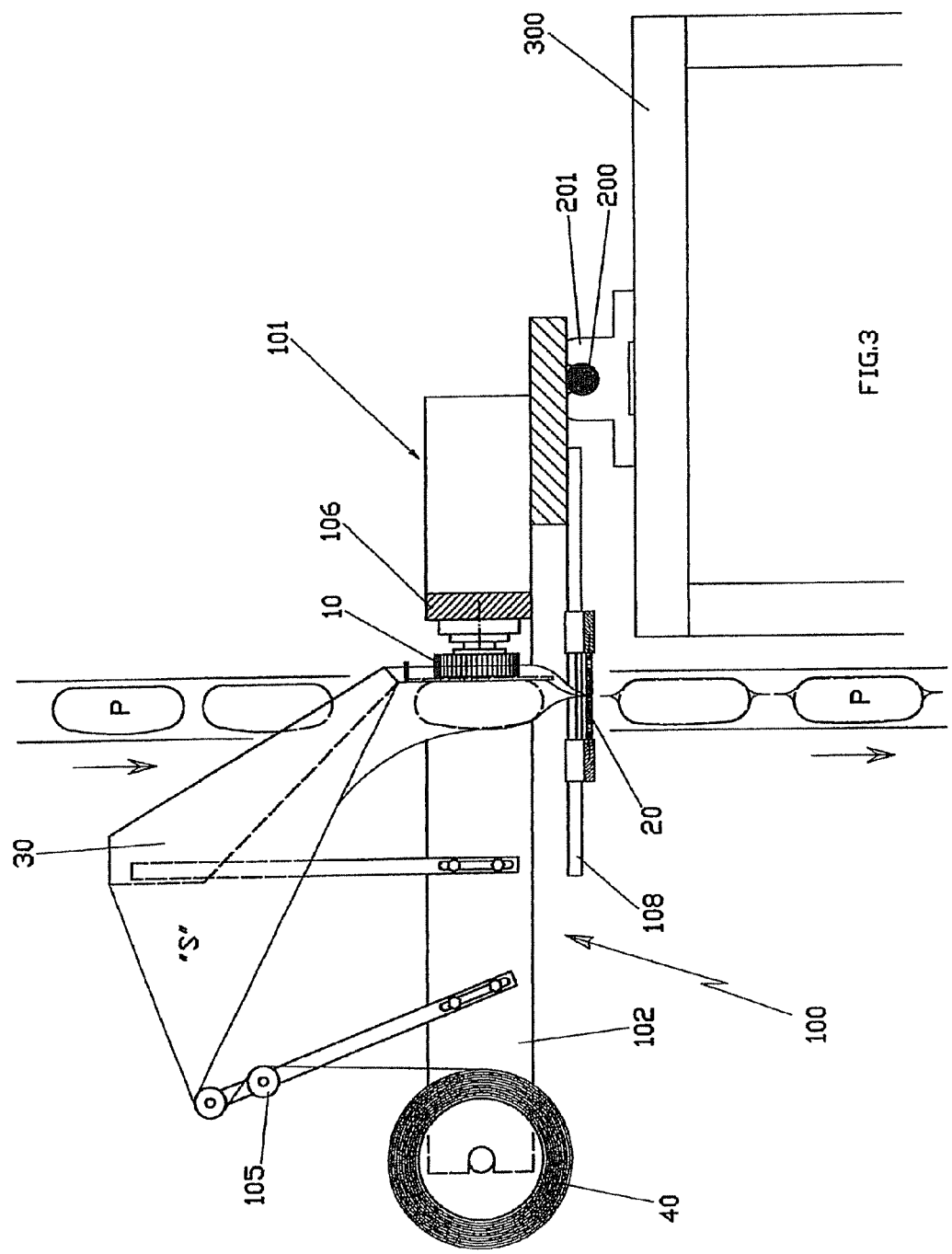
Figure 4:
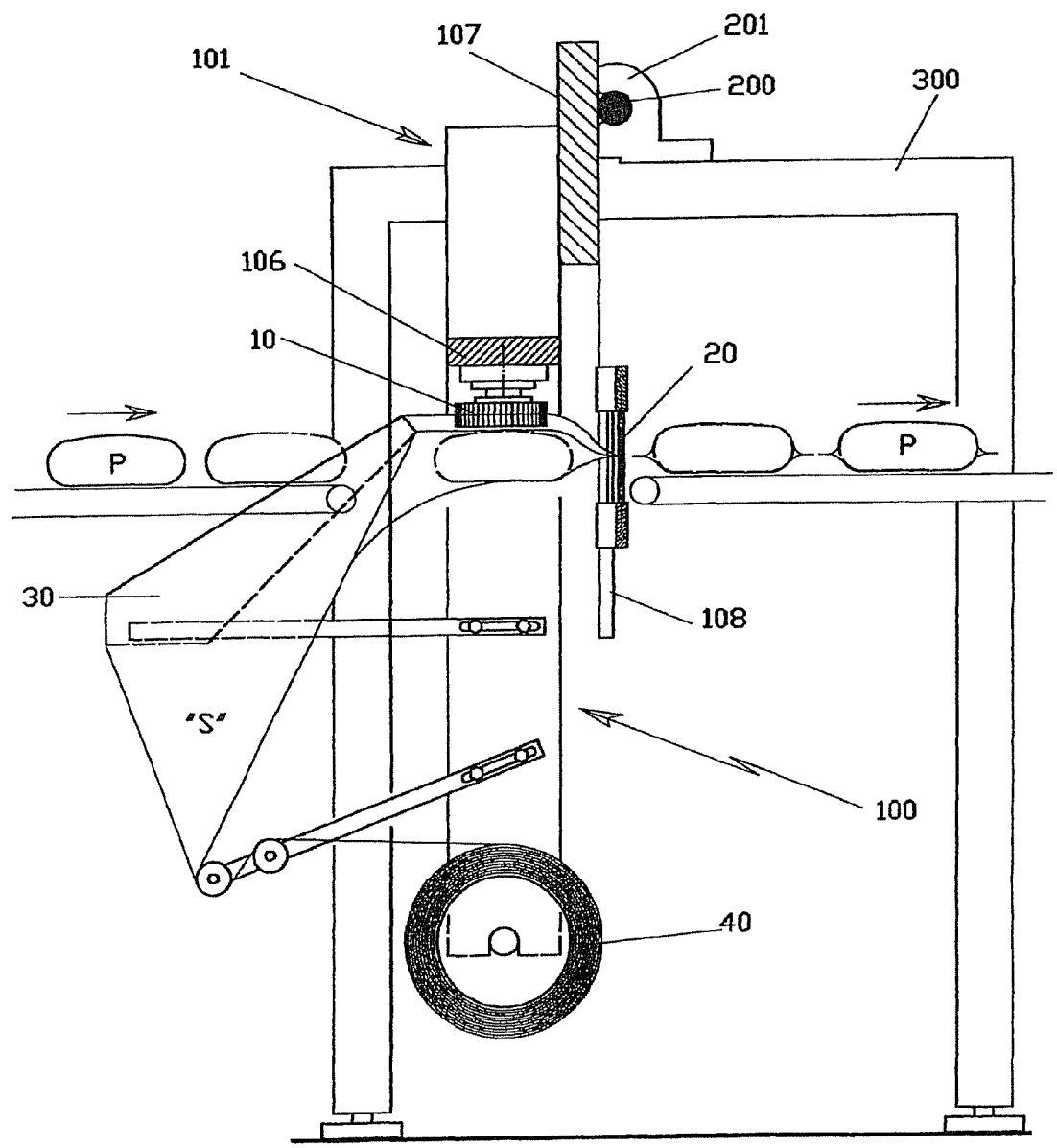
Figure 6:
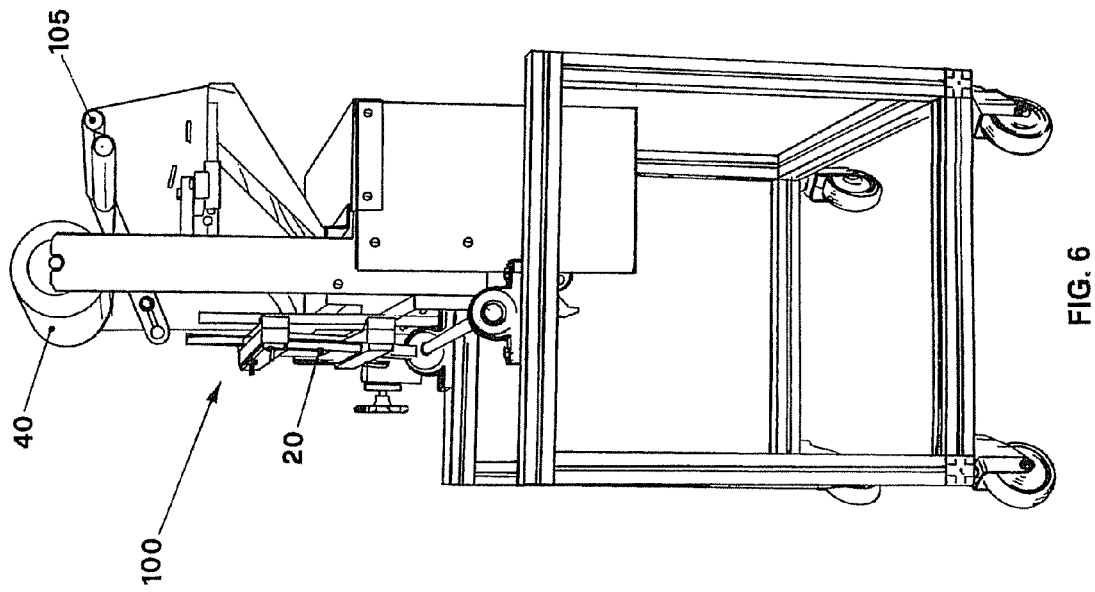
FIGS. 5-6 show two orthogonal views of a machine carried out according to the invention.
Figure 5:
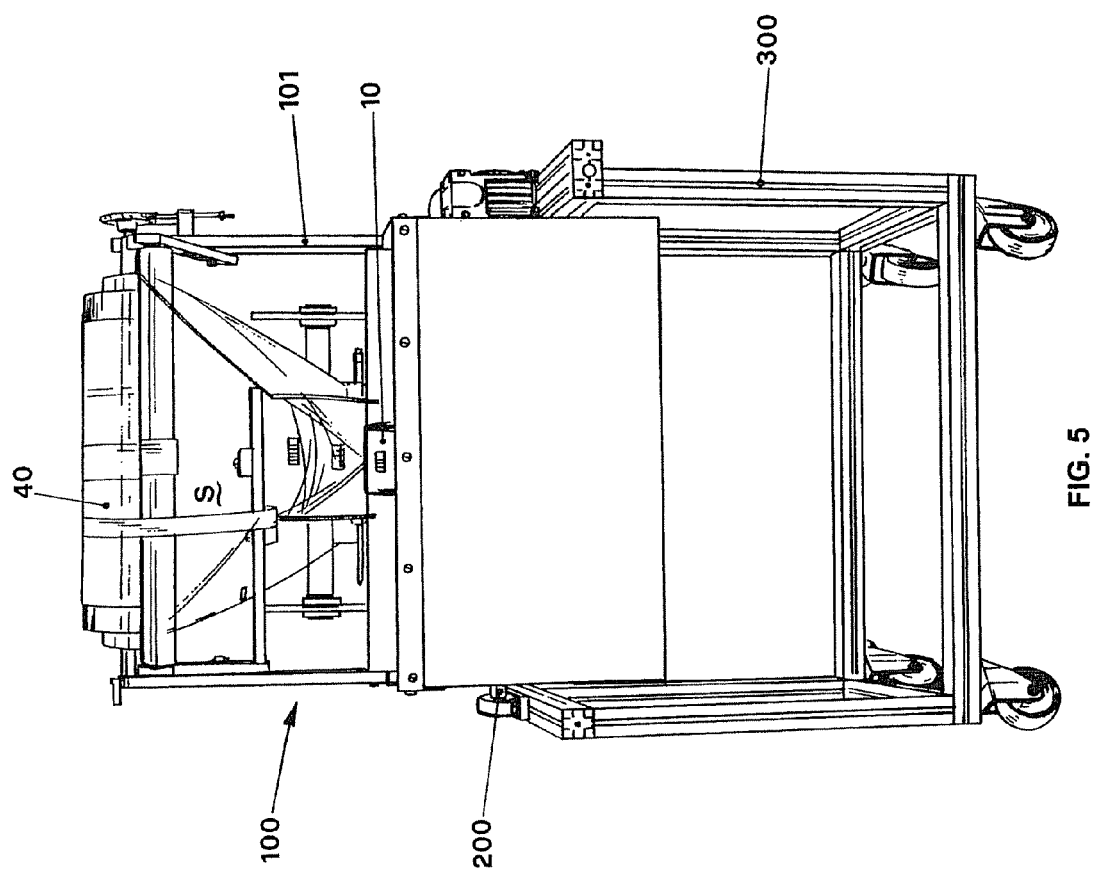

As illustrated in the figures, the packaging machine that is the subject of the invention can indifferently work in the so-called "horizontal" position, with the working unit 100 arranged vertically (see FIG. 1), or variously inclined (see FIG. 2), or in the so-called "vertical" position, with the working unit 100 arranged horizontally (see FIG. 3), or again in the so-called position with "low reel", where the working unit 100 is rotated by 180°.

According to the above and to Figures from 4 to 6, which illustrate a preferred embodiment of the invention, the advantages offered by the machine that is the subject of the invention are evident.

In fact, the working unit 100, thanks to its very compact shape, can be applied to narrow and small bases.

Furthermore the operator, acting simply on a regulator 202, can position the entire working unit 100 so that it is more or less inclined, in order to adapt it to his/her operating needs.

In practice, one of the operating advantages offered by the machine subject of the invention becomes evident when the operator must package individually a limited number of loose products, so that the use of a conventional packaging machine, in particular a vertical machine, is certainly not economic when the products are in powder form.

On the other hand, using the machine that is the subject of the invention, which is not at all expensive, the user can package the individual products, in particular products in powder form, by arranging the working unit 100 horizontally (see FIG. 3) and then proceed to load them manually from above, by simply standing in front of the machine.

Embodiments of the invention even considerably different from the one described herein, depending on the size and the components used, are obviously possible and nonetheless they may fall within the scope of the following claims.

Where technical features mentioned in any claim are followed by reference signs, those reference sings have been included for the sole purpose of increasing the intelligibility of the claims and accordingly such reference signs do not have any limiting effect on the interpretation of each element identified by way of example by such reference signs.

The invention claimed is:

1. A packaging machine using heat sealable film, suitable for packaging products with a heat sealable film or net comprising:
    a working unit that is rotatable as a whole, the working unit having mounted thereon a reel from which said film or net is unwound during use, a forming tunnel for shaping said film or net during use, heat sealing rollers for making a longitudinal edge of a package during use, and cut-and-sew blades for making two transverse edges of said package during use, the working unit being configured to keep the reel, the tunnel, the rollers, and the blades in the same position relative to each other despite the position of the working unit;
    the packaging machine further including a pin housed in a support fixed to a base of said packaging machine;
    wherein said a working unit is rotatably coupled to said pin and rotatable as a whole unit into a plurality of user-selected working positions relative to the base;
    whereby said working unit may be rotated to a user-selected working position to permit entry of the products to be packaged from directions corresponding to an angular orientation of the working unit relative to the base of the packaging machine.

2. A packaging machine using heat sealable film according to claim 1, wherein the working unit consists of a rigid frame comprising two side shoulders that support the reel, a first rod and a second rod that support at least one transmission roller and the forming tunnel, a crosspiece that supports the sealing rollers and a plate welded to the pin and supporting at least one upright on which the blades slide.

3. A packaging machine using a heat sealable film according to claim 1, wherein the working unit can be configured in a vertical arrangement wherein the working unit is in a position perpendicular to a top surface of the base.

4. A packaging machine using a heat sealable film according to claim 1, wherein the working unit can be configured in a horizontal arrangement wherein the working unit is in a position parallel to a top surface of the base.

5. A packaging machine using a heat sealable film according to claim 3, wherein the working unit can be configured in an inverted vertical arrangement wherein the working unit is in a position where the reel is beneath the top surface of the base.

6. A packaging machine using a heat sealable film according to claim 1, wherein the working unit can be configured in an inclined arrangement wherein the working unit is generally neither vertically-oriented nor horizontally-oriented.

* * * * *